(12) United States Patent
Lyshkow

(10) Patent No.: US 6,265,688 B1
(45) Date of Patent: Jul. 24, 2001

(54) METHOD OF WELDING METALS AND APPARATUS FOR USE THEREFOR

(76) Inventor: Norman A. Lyshkow, 3550 N. Lake Shore Dr. #2702, Chicago, IL (US) 60657

( * ) Notice: Subject to any disclaimer, the term of this patent is extended or adjusted under 35 U.S.C. 154(b) by 0 days.

(21) Appl. No.: 09/497,327

(22) Filed: Feb. 3, 2000

(51) Int. Cl.[7] .................................................. B23K 11/20
(52) U.S. Cl. ..................................... 219/110; 219/121.64
(58) Field of Search ..................................... 219/110, 109, 219/121.64, 121.63, 118; 324/451

(56) References Cited

U.S. PATENT DOCUMENTS

| | | | |
|---|---|---|---|
| 4,019,364 | * | 4/1977 | Maddox ............................... 324/451 |
| 4,392,044 | * | 7/1983 | Wang et al. .......................... 219/109 |
| 5,298,711 | * | 3/1994 | Leon ..................................... 219/110 |
| 5,721,415 | * | 2/1998 | Fortmann et al. .................... 219/109 |
| 5,726,409 | * | 3/1998 | Fortmann et al. .................... 219/110 |

* cited by examiner

Primary Examiner—Clifford C. Shaw
(74) Attorney, Agent, or Firm—Rockey, Milnamow & Katz, Ltd.

(57) ABSTRACT

A method for welding parts using the thermo-electrical output of the metals to be welded to control and evaluate the welding process in which a single energy pulse, such as an electric current or a laser, containing a known amount of electricity is applied to the metals to heat the metals to be welded. Then the thermo-electric output of the metals to be welded is used to determine the mass of the metals. The energy necessary to effectively weld the metals is then determined as a function of the mass.

12 Claims, 5 Drawing Sheets

METHOD OF WELDING METALS AND APPARATUS FOR USE THEREFOR

This invention relates, to the welding of metals, and particularly the welding of metals using the thermo-electricity output of the metals being welded to control and evaluate the welding process.

BACKGROUND OF THE INVENTION

It is commonplace, in the manufacture of a wide variety of electronic and/or fabricated metal parts require spot welds to weld together two metals, and frequently metals which are dissimilar to each other. One of the difficulties that has been incurred by the prior art in welding such metals is the inability to accurately control the power used in the welding operation and hence the quality of the weld itself. It has been proposed, as described in U.S. Pat. Nos. 4,019,364, 4,392,044 and 5,298,711, to either evaluate the quality of a weld or to control the welding operation using the welded part as a thermocouple.

The techniques as described in the afore-mentioned patents suffer from the disadvantage of not being suitable to both control and evaluate in the same operation the welding process.

It is accordingly an object of the present invention to provide a new and improved method for the welding of metals using the thermo-electricity output of the metals being welded to both control and evaluate the welding process.

It is a related object, of the present invention to provide a method for the welding of metals in which the weld current is optimized using the resistance of the metals being welded and the rate of cooling of the metals being welded as a measure of the mass of the metals.

It is a more specific object of the invention to provide a method for the welding of metals in which an initial pulse of current is applied to the metals being welded to enable the resistance of the metals to be calculated and to enable the mass of the metals to be determined by the rate of cooling of the metals for use in the determination of the necessary welding energy required to effectively weld the metals.

It is yet another object of the invention to provide a method for the control and evaluation of the welding of metals in which the rate of cooling of the welded metals is used to evaluate the quality of the weld.

These and other objects and advantages of the invention will appear more fully hereinafter. For purposes of illustration and no of limitation, the invention is described in the following drawings.

The present invention is directed to a method and apparatus for welding metals, and particularly dissimilar metals in which use is made of the thermo-electricity output of the metals being welded to both control and evaluate the welding process.

In the practice of the invention, a known amount of thermal energy is applied to the metals to be welded which serves to heat the metals to a temperature above ambient. The two metals together function as a thermo-couple, and thus the thermo-electricity output of the metals to be welded is measured to determine the rate of heat loss as the thermal energy imparted to the metals is dissipated. The rate of heat loss is a function of the mass of the metals to be welded, and thus the thermo-electricity output is a measure of the mass of the metals to be welded. That mass is then used to determine the energy necessary to effectively weld the metals. Using the energy necessary to weld the metals, it is possible to determine the optimum welding power necessary to effect the weld.

In the practice of the invention, the energy pulse applied to the metals to be welded can be applied from a number of known energy sources typically used in welding; for example, the energy pulse may be a simple electrical current pulse or it can be the energy contained in a single laser beam. In either case, the energy supplied to the metals to be welded serves to heat those metals, and the thermo-electricity output of the metals together functioning as a thermo-couple enables the determination of the rate of heat loss as a function of the mass of the metals.

The concepts of the present invention are applicable, as indicated, both to pulse laser beam and electrical resistance welding techniques, both of which are well known to those skilled in the art. When using electrical resistance welding, it is also possible to use a pulse of electric current to determine the resistance of the metals to be welded. In that situation, both the resistance level and the mass of the metals being welded are used together in determining the energy necessary to effectively weld the metals.

In accordance with another embodiment of the invention, it is also possible, and sometimes desirable, to use the thermo-electricity output of the welded metals to evaluate the quality of the weld. In that embodiment, the rate at which the thermo-electricity output of the welded metals declines with time is determined as a measure of the quality of the weld. It has been found that a quality weld has as its signature a rapid decline in that output voltage whereas a weld of lesser quality generally exhibits the signature of a more uniform reduction in the thermo-electricity output over time as the welded metals cool.

DETAILED DESCRIPTION OF THE INVENTION

Figure 1:
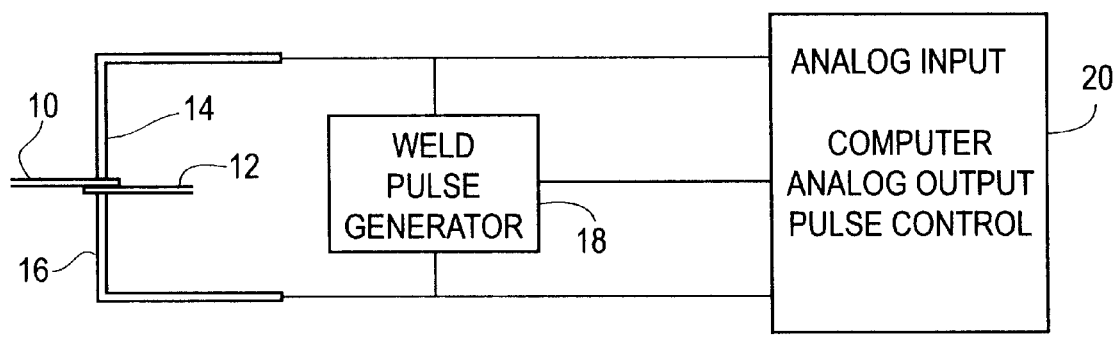
FIG. 1 is a schematic illustration of the welding system employed in the practice of the invention.

An overall schematic of the welding system employed in the practice of the present invention is illustrated in FIG. 1 of the drawings. As shown there, two pieces of metal 10 and 12 are positioned in contact with each other where a weld is to be made. The two metal pieces 10 and 12 are thus positioned between a pair of contacts 14 and 16. Included in the system is a weld pulse generator 18 and a computer controlled analog output pulse control system generally shown as 20.

The metals to be welded can be any of a wide variety of metals which are either the same or different from the other. In general, the metals employed are those metals which can be welded by, for example, electric resistance welding and/or pulse laser welding as well as other welding techniques. For example, use can be made of welding techniques known to those skilled in the art as acetylene welding, heliac welding, TIG welding and arc welding along with electrical resistance and pulse laser welding.

Figure 2:
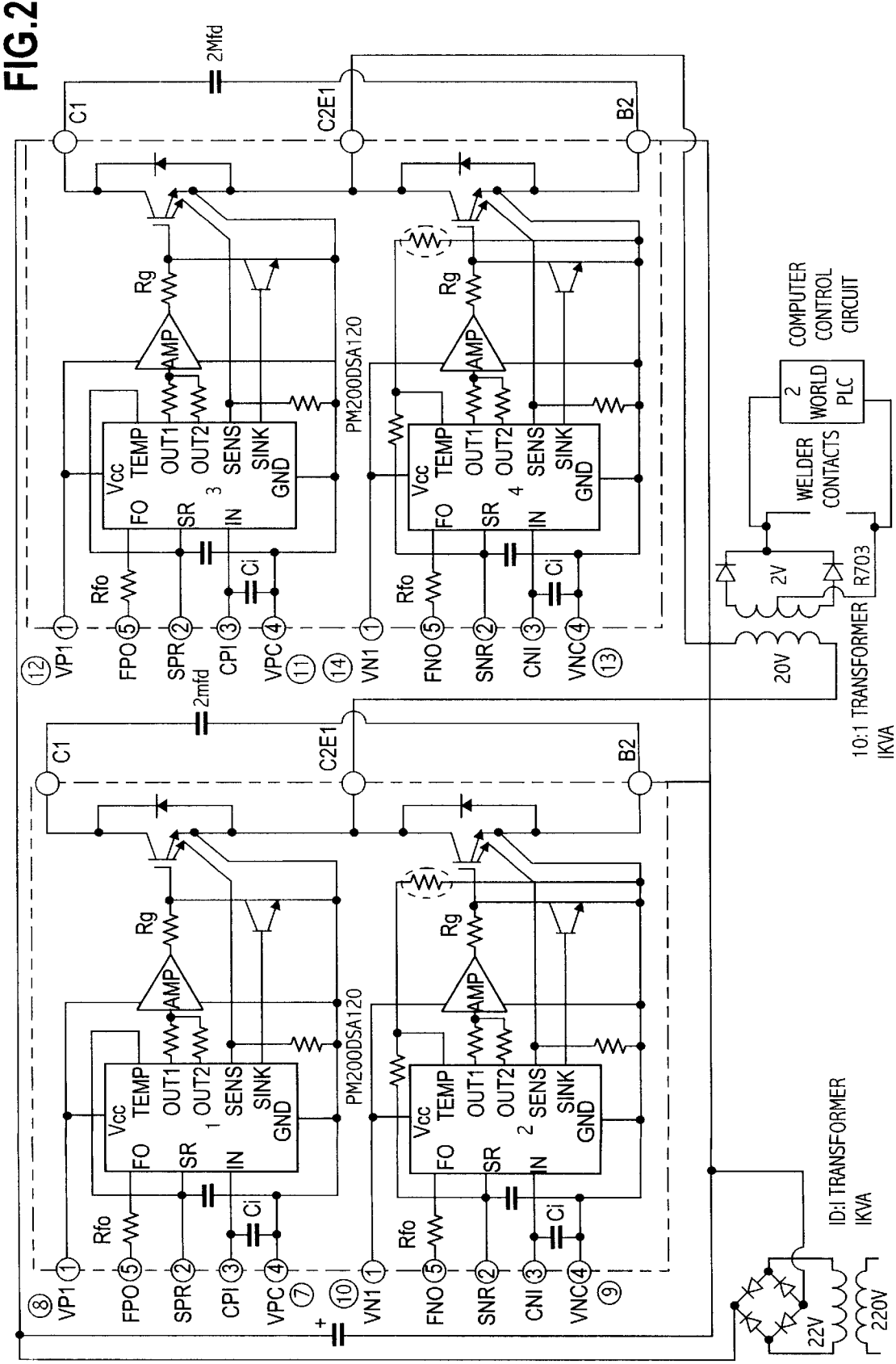
FIG. 2 is a schematic illustration of the welding power circuit, including, as a separate circuit, the computer analog output pulse control circuit as illustrated in FIG. 2A.

The weld pulse generator 18 as illustrated in FIG. 1 is shown in detail in FIG. 2, and has been found to be particularly suitable when using electrical resistance welding. The circuitry contained in FIG. 2 is known to those skilled in the art and forms no part of the present invention. That circuitry is known as an insulated gate bipolar transistor inverter circuit which drives the welding transformer.

Figure 2A:
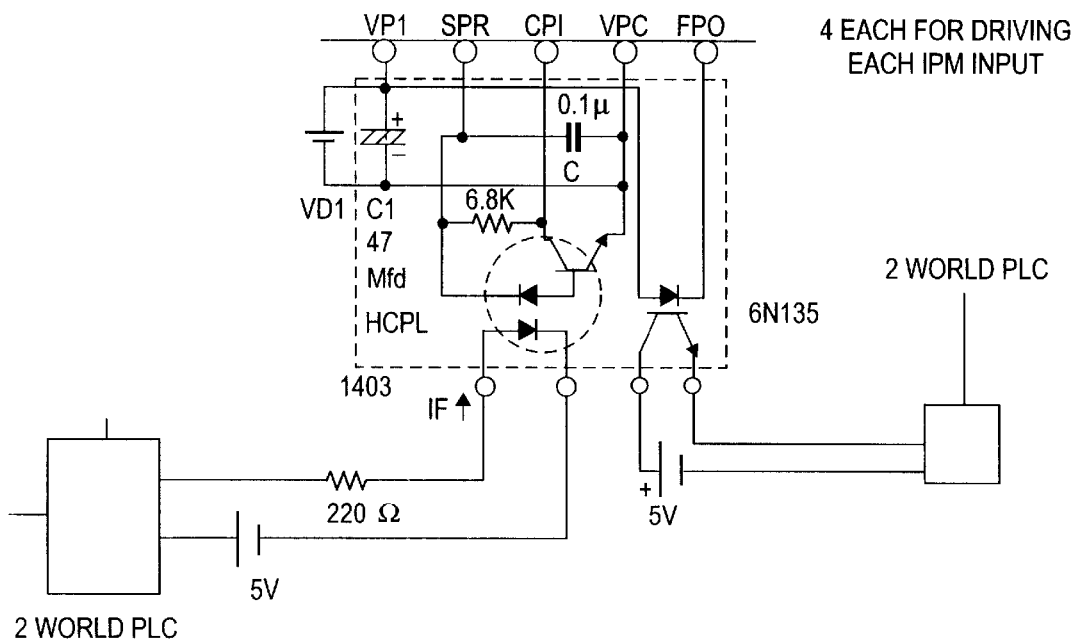
Figure 2B:
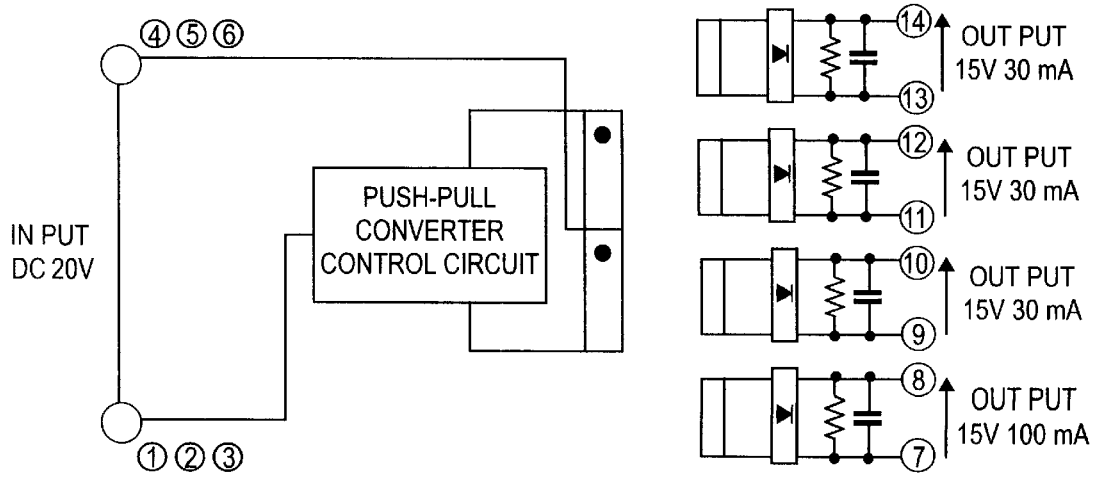

The computer analog output pulse control is illustrated in FIG. 2A of the drawings and is likewise a known circuit utilizing a computer to control the generation of the pulses.

In the preferred practice of the present invention, welding is effected by the known technique of electrical resistance welding. In the practice of the present invention, the metals 10 and 12 are subjected to an electric current pulse containing a known quantity of energy. The magnitude of the pulse depends on a number of factors, including the nature of the metals to be welded as well as their total masses. For most applications, pulses having a duration of 1 to 50 milliseconds and containing between 50 and 3,000 average amps have been found to be desirable. It should be understood, however, by those skilled in the art that larger welding jobs may necessitate longer pulse times and/or significantly larger current pulses. Typically the energy content of those pulses ranges from about 0.5 to 100 joules. Nonetheless, greater or lesser energy requirements may be appropriate depending on the size of the welding job to be performed.

When the single current pulse is applied to the metals being welded, it is generally desirable to calculate, knowing both the current and voltage of the pulse, the resistance of the metals being welded. In addition, the application of the single current pulse containing the known amount of energy serves to heat the metals being welded to a temperature above ambient. The contacts 14 and 16 also serve to monitor the thermo-electricity output of the metals being welded. It has been found that the mass of the metals being welded is a function of the rate at which those metals cool which can be determined by measuring the rate of reduction in the thermo-electricity output of the metals during cooling after the application of the single current pulse. That rate of thermo-electric voltage reduction is then used to determine the amount of energy necessary to effectively weld the metals.

Figure 3:
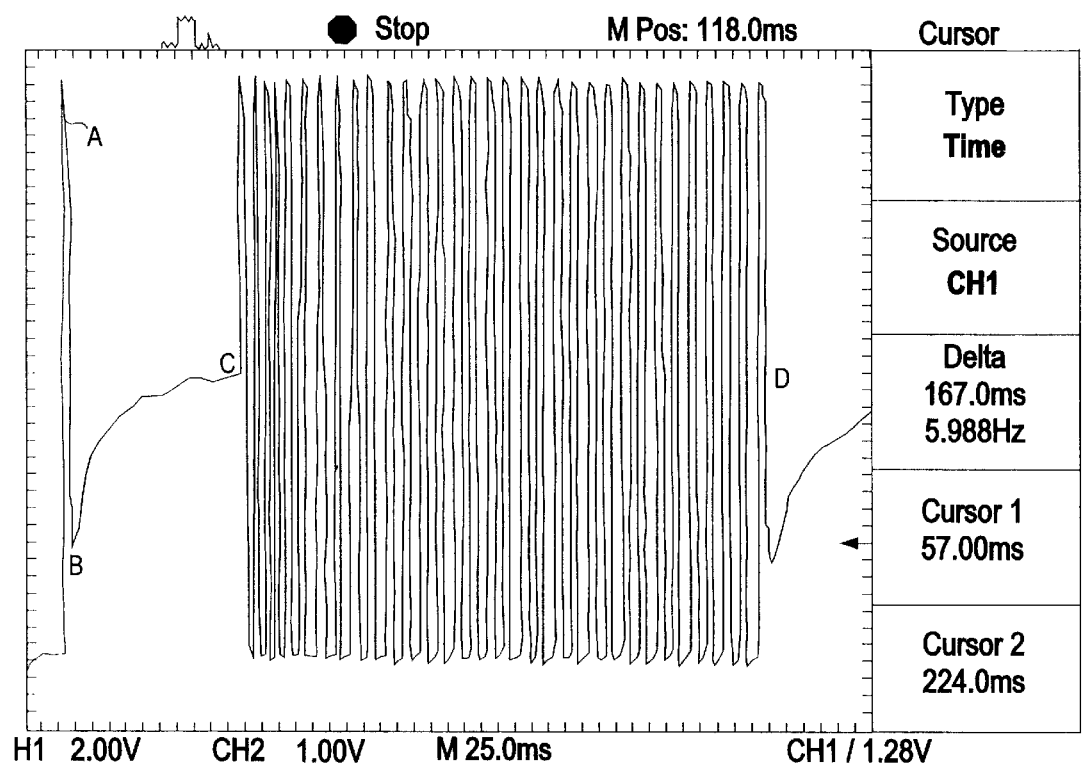
FIG. 3 is a graphical representation of the electrical pulse employed in the practice of the invention.

As an example, the energy pulse used in welding wires of two dissimilar metals, namely Kovar and nickel, is illustrated in FIG. 3 of the drawing. FIG. 3 is a plot of voltage on the vertical axis and time in mill-seconds on the horizontal axis. The initial current pulse is illustrated in FIG. 3 as pulse A and may be a pulse of about 400 amps applied to the Kovar-nickel wires to be welded over a time of about 5 milliseconds through the contacts 14 and 16 in FIG. 1.

The contacts 14 and 16 thus apply a known current pulse I having a known voltage V to the wires to be welded. Using the conventional equation that R=V/I, the resistance R of the wires can be calculated, typically using a computer. In addition, the voltage output of the weld, namely points B to C in FIG. 3, is also monitored. Because the two wires to be welded function as a thermo-couple, the rate of cooling between points B and C can be monitored by monitoring the voltage drop between points B and C as a measure of the mass. Using the familiar equation that the energy in joules is equal to $I^2RT$ where R is the resistance and T is the time in seconds, the amount of energy in joules can be determined by the foregoing equation.

In the preferred practice of the invention, the welding current is applied to the metals to be welded by a number of pulses between points C and D in FIG. 3. Thus the welding current pulses are preferably applied N number of times as determined by the energy required to effect the weld. N is determined by the calculated mass and resistance of the materials to be welded.

In accordance with the preferred practice of the invention, after the weld has been made by the application of N number of current pluses, the rate of cooling is then measured by the rate in decline of the voltage generated by the welded metals serving as a thermocouple. That effect may be illustrated in FIG. 4 of the drawing in which there is shown a plot of voltage versus time for the metals which have already been welded. The thermo-electricity output of the welded metals illustrated as a voltage is shown by curve E which declines between points E and D. It has been found that there is a correlation between the rate of decline in the thermo-electricity output of the welded metals which is directly related to the quality of the weld. In, for example, the curve between points E and D, the rapid rate of voltage decline, and particularly between points E and F, is indicative of a good weld.

Figure 4:
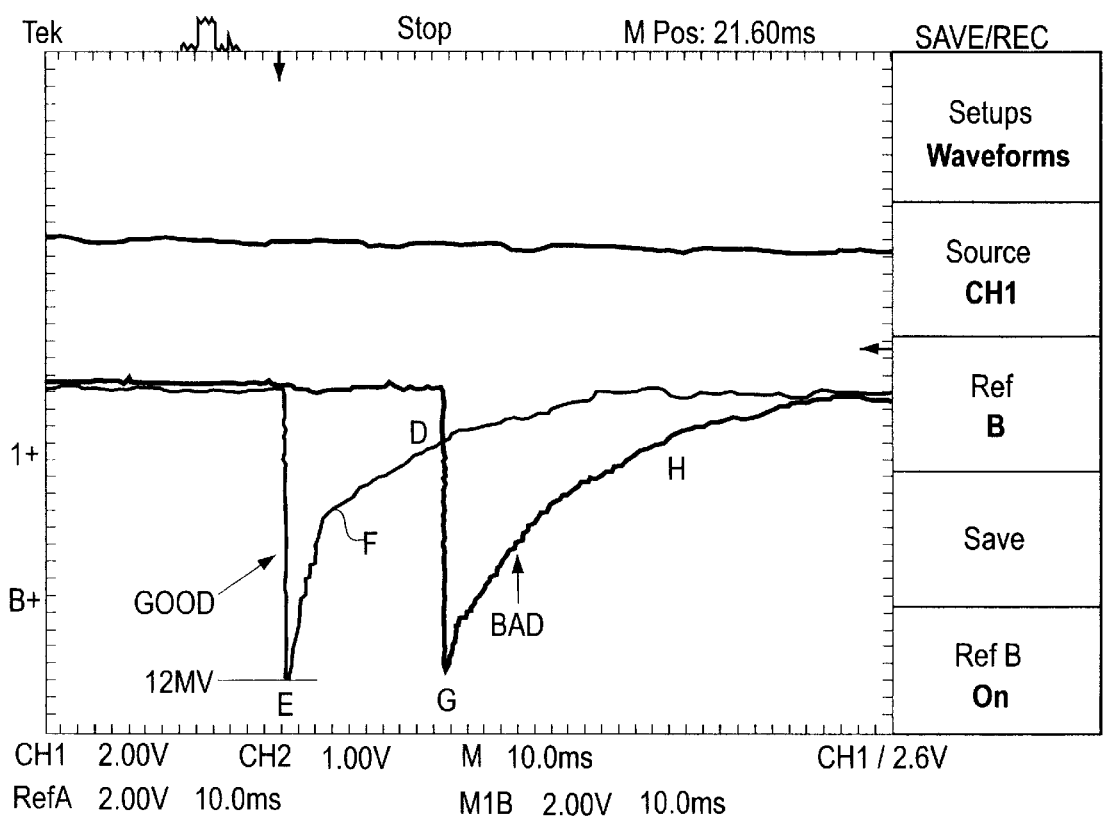
FIG. 4 is illustrative of the wave forms used in the evaluation of the welding operation.

FIG. 4 also illustrates the rate of thermo-electricity decline of another weld between points G and H. The gradual rate of voltage decline as measured by the contacts 14 and 16 in the weld is indicative of a weld of lesser quality.

Thus, the thermo-electricity output of the metals to be welded and of the weld as effected can be used to control the weld as well as to evaluate its quality.

It will be understood that various changes and modifications can be made in the details of procedure and use without departing from the spirit of the invention especially as defined in the following claims.

What is claimed:

1. A method for welding metals using the thermo-electricity output of the metals to be welded to control and evaluate the welding process comprising the steps of:

(a) applying to the metals to be welded a single energy pulse containing a known amount of energy whereby the energy pulse heats the metals to be welded;

(b) determining the thermo-electricity output of the metals to be welded to determine the mass of the metals to be welded as a function of the rate of cooling;

(c) determining the energy necessary to effectively weld the metals as a function of the mass of the metals as determined by the thermo-electricity output therefrom; and (d) applying the welding current containing the determined energy to effect the weld.

2. A method as defined in claim 1 wherein the energy pulse is an electric current pulse.

3. A method as defined in claim 1 wherein the energy pulse is supplied in a laser beam.

4. A method as defined in claim 1 wherein the energy pulse is a pulse of electrical current and the energy necessary to effect welding the metals is determined by the mass of the metals and the resistance of the metals.

5. A method as defined in claim 1 which includes the step of measuring the thermo-electricity output of the metals after welding as a measure of the quality of the weld.

6. A method as defined in claim 1 wherein the energy pulse is an electrical current having a duration of about 1 to about 50 milliseconds.

7. A method as defined in claim 6 wherein the electrical current pulse contains about 50 to about 300 average amps.

8. A method as defied in claim 6 wherein the electrical content of the energy pulse ranges from about 0.5 to 100 joules.

9. A method for welding metals using the thermo-electricity output of the metals to be welded to control and evaluate the welding process comprising the steps of:

(a) applying to the metals to be welded a single current pulse containing a known amount of energy whereby the current pulse heats the metals to be welded;

(b) measuring the resistance of the metals to be welded as a function of the current pulse and its voltage and measuring the mass of the metals to be welded as a function of the rate of cooling as determined by the level of the thermo-electricity;

(c) determining the energy necessary to effectively weld the metals as a function of the resistance of the metal to be welded and the mass of the metals as determined by the thermo-electricity output therefrom; and (d) applying a welding current containing the determined energy to effect the weld.

10. A method as defined in claim 9 wherein the energy is an electrical current having a duration of about 1 to 50 milliseconds.

11. A method as defined in claim 9 wherein the electrical current pulse contains about 50 to about 300 average 12. A method as defied in claim 9 wherein the electrical content of the energy pulse ranges from about 0.5 to 100 joules.

* * * * *

UNITED STATES PATENT AND TRADEMARK OFFICE
CERTIFICATE OF CORRECTION

PATENT NO. : 6,265,688 B1
DATED : July 24, 2001
INVENTOR(S) : Norman A. Lyshkow

Page 1 of 1

It is certified that error appears in the above-identified patent and that said Letters Patent is hereby corrected as shown below:

Column 1,
Line 11, cancel "require" and substitute -- to require -- therefor.
Line 49, cancel "no" and substitute -- not -- therefor.

Column 3,
Line 43, cancel "mill-seconds" and substitute -- milliseconds -- therefor.

Column 6,
Line 3, cancel "energy" and substitute -- energy pulse -- therefor.

Signed and Sealed this

Twenty-ninth Day of January, 2002

Attest:

JAMES E. ROGAN
Attesting Officer
Director of the United States Patent and Trademark Office